(12) United States Patent
Scott

(10) Patent No.: US 7,180,994 B2
(45) Date of Patent: Feb. 20, 2007

(54) METHOD AND SYSTEM FOR OPERATOR SERVICES AUTOMATION USING AN OPERATOR SERVICES SWITCH

(75) Inventor: Dwight E. Scott, Buena Park, CA (US)

(73) Assignee: Volt Information Sciences, Inc., New York, NY (US)

( * ) Notice: Subject to any disclaimer, the term of this patent is extended or adjusted under 35 U.S.C. 154(b) by 182 days.

(21) Appl. No.: 10/172,101

(22) Filed: Jun. 13, 2002

(65) Prior Publication Data

US 2003/0231751 A1 Dec. 18, 2003

(51) Int. Cl.
*H04M 3/42* (2006.01)
*H04M 15/00* (2006.01)
*H04M 3/00* (2006.01)

(52) U.S. Cl. ............... 379/218.01; 379/265.02; 379/114.05; 379/223

(58) Field of Classification Search ........... 379/201.01, 379/218.01, 218.02, 265.01, 265.02, 260, 379/262, 263, 114.01, 114.05, 114.03, 114.21, 379/114.23, 88.01, 222, 223, 228
See application file for complete search history.

(56) References Cited

U.S. PATENT DOCUMENTS

| | | | |
|---|---|---|---|
| 4,797,910 A | | 1/1989 | Daudelin ............... 379/67 |
| 5,163,083 A * | | 11/1992 | Dowden et al. ....... 379/88.03 |
| 5,185,781 A | | 2/1993 | Dowden et al. ....... 379/67 |
| 5,479,488 A * | | 12/1995 | Lennig et al. ......... 379/88.04 |
| 5,613,006 A * | | 3/1997 | Reese ................... 379/67.1 |
| 5,623,539 A | | 4/1997 | Bassenyemukasa et al. .. 379/88 |
| 5,627,887 A * | | 5/1997 | Freedman ............. 379/114.21 |
| 5,638,425 A * | | 6/1997 | Meador et al. ........ 379/88.01 |
| 5,659,597 A | | 8/1997 | Bareis et al. .......... 455/563 |
| 5,703,935 A * | | 12/1997 | Raissyan et al. ...... 379/88.18 |
| 5,892,820 A * | | 4/1999 | Armstrong et al. .... 379/213.01 |
| 6,044,142 A * | | 3/2000 | Hammarstrom et al. ... 379/223 |
| 6,381,325 B1 * | | 4/2002 | Hanson ............... 379/218.01 |
| 6,430,285 B1 | | 8/2002 | Bauer et al. .......... 379/265.01 |
| 6,480,598 B1 * | | 11/2002 | Reding et al. ........ 379/265.01 |
| 6,594,352 B1 * | | 7/2003 | Smith ................. 379/114.01 |
| 6,628,772 B1 * | | 9/2003 | Cox et al. ............ 379/218.01 |
| 6,795,543 B1 * | | 9/2004 | Cartier et al. ....... 379/219 |

* cited by examiner

*Primary Examiner*—Quoc Tran
(74) *Attorney, Agent, or Firm*—Jenkens & Gilchrist, P.C.

(57) ABSTRACT

A telecommunications system includes a front end automation system, an operator services switch, an automated operator, and an automation data server. The front end automation system interacts with a caller in order to recognize a request of the caller and determine a response to the request. The operator services switch, which is inter-operably coupled to the front end automation system, receives a call from the front end automation system, after the front end automation system has recognized the request and has determined the response to the request, and creates billing information relative to the call. The automation data server, which is inter-operably coupled to the front end automation system, passes information about the request and the response from the front end automation system to the automated operator. The automated operator, which is inter-operably coupled to the operator services switch, provides the response to the request to the caller.

35 Claims, 5 Drawing Sheets

METHOD AND SYSTEM FOR OPERATOR SERVICES AUTOMATION USING AN OPERATOR SERVICES SWITCH

BACKGROUND

1. Technical Field

The present invention relates to operator services automation using an operator services switch. More particularly, the present invention relates to providing automated operator services using a front end automation system before an operator services switch and a back end automation system after the operator services switch so that use of the front end automation system does not prevent the operator services switch from performing its functions, such as, for example, generation of a call-detail record or billing of calls.

2. History of Related Art

Existing operator services switches provide considerable functionality in support of call handling. The support provided by operator services switches includes eligibility screening for special services such as, for example, directory-assistance call completion and also includes call-detail record processing for subsequent billing of calls.

FIG. 1A is a block diagram that illustrates an operator services system 100A of the prior art that generates responses to a caller's request via a human operator. The operator services system 100A includes an operator services switch (OSS) 102, which can perform call screening and generate call-detail records for billing purposes. The operator services switch 102 is connected to a subscriber set 104, to an operator work station 106 manned by a human operator, and to an automated response unit 108 via respective voice connections. The operator services switch 102 is connected via a data connection to a billing center 112. The subscriber set 104 is used by a caller to make a directory-assistance call. An operator services switch interface component 110 is connected to the operator services switch 102, to the automated response unit 108, and to the operator work station 106 via respective data connections. Voice connections in FIG. 1A are designated by bold lines, while data connections are indicated by fine lines. Other network elements (not shown) that are functionally transparent to the entities shown in FIG. 1A can be involved in the voice connections shown in FIG. 1A.

When a directory-assistance call is placed by the caller, a voice communication (i.e., a call) between the subscriber set 104 through the operator services switch 102 and the operator work station 106 to a human operator occurs. The operator services switch 102, upon receiving the call from the subscriber set 104, performs an initial screen to determine what restrictions are associated with the call and which operator group the call should be sent to. The human operator communicates with the caller via the subscriber set 104, the operator work station 106, and the operator services switch 102. After the operator work station 106 has obtained information responsive to a request of the subscriber set 104, the operator work station 106, in response to a command from the human operator, communicates with the operator services switch interface component 110.

In response to the communication from the operator work station 106, the operator services switch interface component 110 sends a transfer-request message to the operator services switch 102. In response to the transfer-request message, the operator services switch 102 assigns a trunk associated with the automated response unit 108, transfers the call to a port associated with the automated response unit 108, and releases the operator work station 106 from the call.

The operator services switch interface component 110, having been notified of the assigned port associated with the automated response unit 108, sends information responsive to the request of the caller to the automated response unit 108, which delivers the response to the subscriber set 104 via the voice connection between the automated response unit 108 and the operator services switch 102 and the voice connection between the operator services switch 102 and the subscriber set 104. When the call is disconnected from the operator services switch 102 following delivery of the response to the caller, the operator services switch 102 completes a call-detail record process, generates a billing record for the call, and sends the billing record to the billing center 112.

It is preferable that as many calls as possible be totally automated, because automation can lower expenses by reducing the number of calls that must be handled by human operators. FIG. 1B illustrates an operator services system 100B of the prior art that responds to caller requests in an automated fashion. Operator services call automation can be accomplished by inserting an automated recognition and response unit (ARRU) 114 between the subscriber set 104 and the operator services switch 102. The automated recognition and response unit 114 so inserted typically interacts with the caller, identifies the request of the caller from the subscriber set 104 using speech recognition technology, and provides information requested by the caller to the caller, such as, for example, a telephone number. Information instead of or in addition to a telephone number can be provided in a similar fashion. For example, a name and an address, a zip code, information about products, services, or business offers, weather information, sports scores, horoscope information, or driving directions can be provided.

A limitation of a system utilizing the automated recognition and response unit 114 is that, when the request of the caller is responded to by the automated recognition and response unit 114 and the caller does not request to speak to a human operator, the operator services switch 102 is not able to perform its billing functions because the caller's request is completely handled by the automated recognition and response unit 114 without passing the call to the operator services switch 102. Therefore, functionality normally provided by the operator services switch 102 relative to the call (e.g. billing information) is not available unless the functionality is provided by the automated recognition and response unit 114. Although the functionality normally provided by the operator services switch 102 relative to the call can be incorporated into the automated recognition and response unit 114, it would be preferable to not duplicate the functionality already present in the operator services switch 102.

When the automated recognition and response unit 114 correctly recognizes only part of the recognized request of the caller but needs to forward the call to a human operator served by the operator services switch 102, it would be desirable to forward information recognized to the operator work station 106 for display to the human operator. Current systems do not have a mechanism for passing the information recognized to the operator work station 106.

SUMMARY OF THE INVENTION

A telecommunications system includes a front end automation system and an operator services switch. The front end automation system is adapted to recognize a request for information from a caller and initiate a call to an operator services switch. The operator services switch is inter-operably coupled to the front end automation system and is adapted to receive the call from the front end automation system and create billing information relative to the call.

A method of responding to a request for information of a caller includes receiving the request from the caller and recognizing the request in an automated fashion. A call is initiated relative to the request to an operator services switch. The operator services switch generates billing information regarding the call.

A method of responding to a request for information of a caller includes receiving the request from the caller and recognizing, in an automated fashion, less than all of the request. A call is initiated relative to the request to an operator via an operator services switch. The operator receives a recognized part of the request. The operator services switch generates billing information regarding the call.

Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

A more complete understanding of the present invention can be had by reference to the following Description when taken in conjunction with the accompanying Drawings, wherein.

DETAILED DESCRIPTION Of THE DRAWINGS

In the following Detailed Description of the Drawings, for purposes of explanation and not limitation, specific details are set forth in order to provide a thorough understanding of embodiments of the present invention. However, it will be apparent to those of ordinary skill in the art that the present invention can be practiced in other embodiments that depart from these specific details. In other instances, detailed descriptions of well-known methods, devices, etc. are omitted so as not to obscure the description of the present invention with unnecessary detail. Preferred embodiments of the present invention and its advantages are best understood by referring to FIGS. 2–6 of the Drawings, like numerals being used for like and corresponding parts of the various Drawings. Wherever in the following FIGURES a single automated operator or an operator work station manned by a human operator is shown, at least one automated operator or operator work station adapted to be manned by a human operator, respectively, is represented.

Figure 2:
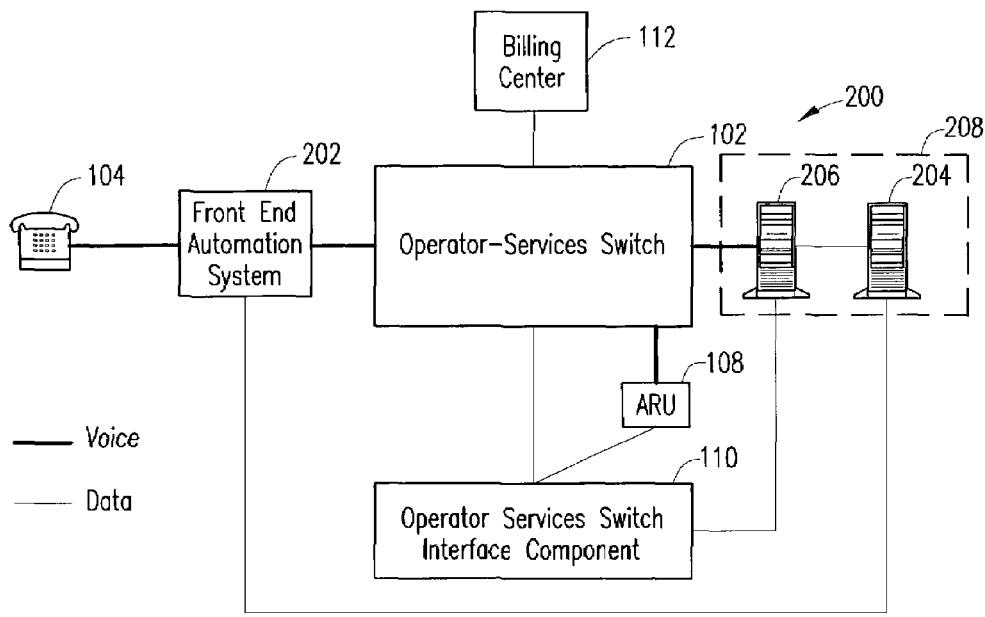
FIG. 2 is a block diagram that illustrates an operator services system in accordance with principles of the present invention that permits use of a front end automation system in conjunction with an operator services switch.

FIG. 2 is a block diagram that illustrates an operator services system 200 in accordance with principles of the present invention that permits use of a front end automation system in conjunction with an operator services switch. The system 200 includes the subscriber set 104, which is connected via a voice connection to a front end automation system 202. The front end automation system 202 is also connected via a voice connection to the operator services switch 102 and via a data connection to an automation data server (ADS) 204. The automation data server 204 is connected via a data connection to an automated operator (AO) 206. The automated operator 206 is connected via a voice connection to the operator services switch 102 and via a data connection to the operator services switch interface component 110. The operator services switch 102 is connected via a data connection to the billing center 112.

The automated operator 206 and the automation data server 204 of the system 200 are collectively referred to as a back end automation system 208, as indicated by dashed lines. Although the back end automation system 208 is shown in FIG. 2 as including two discrete entities, this need not be the case. The back end automation system 208 of a preferred embodiment of the present invention includes the automation data server 204. However, other embodiments (not shown) of the present invention do not utilize an automation data server as part of a back end automation system. For example, when a back end automation system that does not include an automation data server (not shown) is used, an automated operator can signal the front end automation system 202 via a data message on in-band dual tone multi frequency (DTMF) signaling.

The operator services switch interface component 110 is also connected via respective data connections to the automated response unit 108 and to the operator services switch 102. The automated response unit 108 is also connected via a voice connection to the operator services switch 102.

Data connections are indicated in FIG. 2 with fine lines and voice connections are indicated in FIG. 2 with bold lines. Other network elements in addition to those shown in FIG. 2 that are transparent to functional operation of the system 200 can be involved in connection and transport of voice communications among entities of the system 200. In a similar fashion, data routing and transport components in addition to those shown in FIG. 2, such as, for example, hubs, routers, or modems, that are transparent to functional operation of the system 200 can also be present.

Figure 1A:
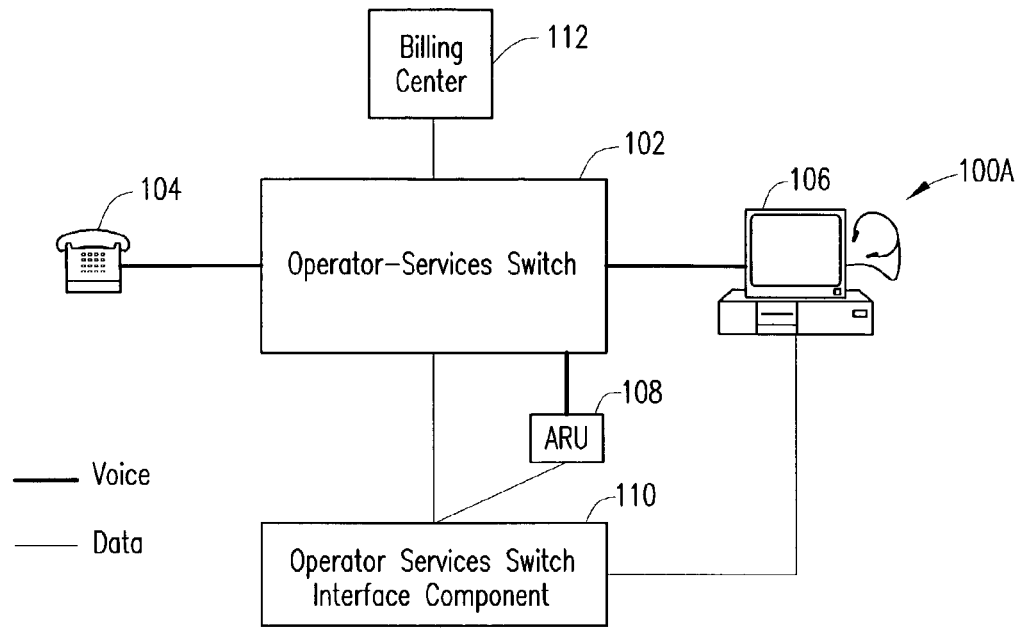
FIG. 1A, previously described, is a block diagram that illustrates an operator services system of the prior art that generates responses to a caller's request via a human operator.
Figure 1B:
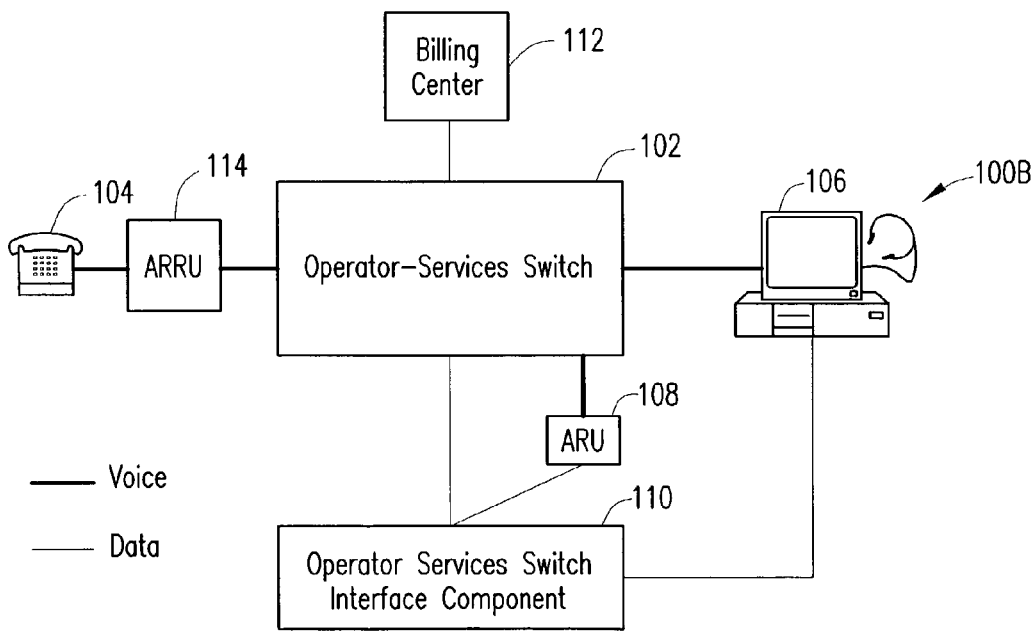
FIG. 1B, previously described, is a block diagram that illustrates an operator services system of the prior art that responds to caller requests in an automation fashion.

Calls can receive the benefit of functions provided by the operator services switch 102, even when the front end automation system 202 is implemented between the caller 104 and the operator services switch 102, by configuring the automated operator 206 so that it is connected to the operator services switch 102 in a similar fashion to a human operator using the operator work station 106 of FIG. 1. At least one automated operator 206 is preferably configured at the operator services switch 102 to appear to the operator services switch 102 to be at least one human operator at an operator work station. The automated operator 206 is configured, for example, to receive calls that arrive at the operator services switch 102 from a specially-designated trunk group or with a specially designated routing code. The automation data server 204 is used to pass information about a request of a caller (e.g., a directory assistance request) and a response to the request from the front end automation system 202 to the automated operator 206.

When a call has been handled by the front end automation system 202 to a point at which a high degree of confidence exists that the request of the caller has been correctly recognized and a response to the request is available, the front end automation system 202 initiates a call into the operator services switch 102. A message is then sent by the front end automation system 202 to the automation data server 204 that preferably includes a trunk group and member identification of a trunk on which the call was placed to the operator services switch 102, information about the request of the caller, and an appropriate response to be given to the caller.

The operator services switch 102, upon receiving the call from the front end automation system 202, performs an initial screen to determine what restrictions are associated with the call and which operator group the call should be sent to. The call is placed in queue for an appropriate automated operator group (e.g., an automated operator group including the automated operator 206). When software associated with the automated operator 206 receives a call-begin message from the operator services switch 102, which message includes information indicating that the call has been assigned to a particular automated operator, the incoming trunk group and member information from the call-begin message is used by the automated operator 206 to query the automation data server 204 and to obtain call information, including the request of the caller and a response to be provided to the request of the caller. The automated operator 206 performs call-treatment processing on the call information received from the automation data server 204 to determine if there is any special handling to be provided for the call.

One of three alternative actions is then undertaken by the automated operator 206. In a first alternative, the automated operator 206 sends an announcement-request message to the operator services switch interface component 110. The announcement-request message includes response information used to generate a response provided to the subscriber set 104. The operator services switch interface component 110 then sends a transfer-request message to the operator services switch 102. In response to the transfer-request message, the operator services switch 102 assigns a trunk associated with the automated response unit 108, transfers the call to a selected port associated with the automated response unit 108, and releases the automated operator 206 from the call. Upon being notified of the selected port of the automated response unit 108, the operator services switch interface component 110 sends the response information to the automated response unit 108. The automated response unit 108 then delivers the response information to the subscriber set 104 via the operator services switch 102. In a second alternative, the automated operator 206 announces the requested information to the subscriber set 104. In a third alternative, the automated operator 206 notifies the front end automation system 202, via in-band dual tone multi frequency (DTMF) signaling, to disconnect the call from the operator services switch 102 and announce the requested information to the subscriber set 104.

Following delivery of the response information to the subscriber set 104, the caller can: (1) have the call automatically dialed (i.e., a call-completion service); (2) be released from the call; or (3) be disconnected from the operator services switch 102 (if disconnection has not already occurred) and prompted for another request by the front end automation system 202. Irrespective of whether (1), (2), or (3) above occurs, when the call is disconnected from the operator services switch 102, the operator services switch 102 completes a call-detail record process, generates a billing record for the call, and forwards the billing record to the billing center 112.

Figure 3:
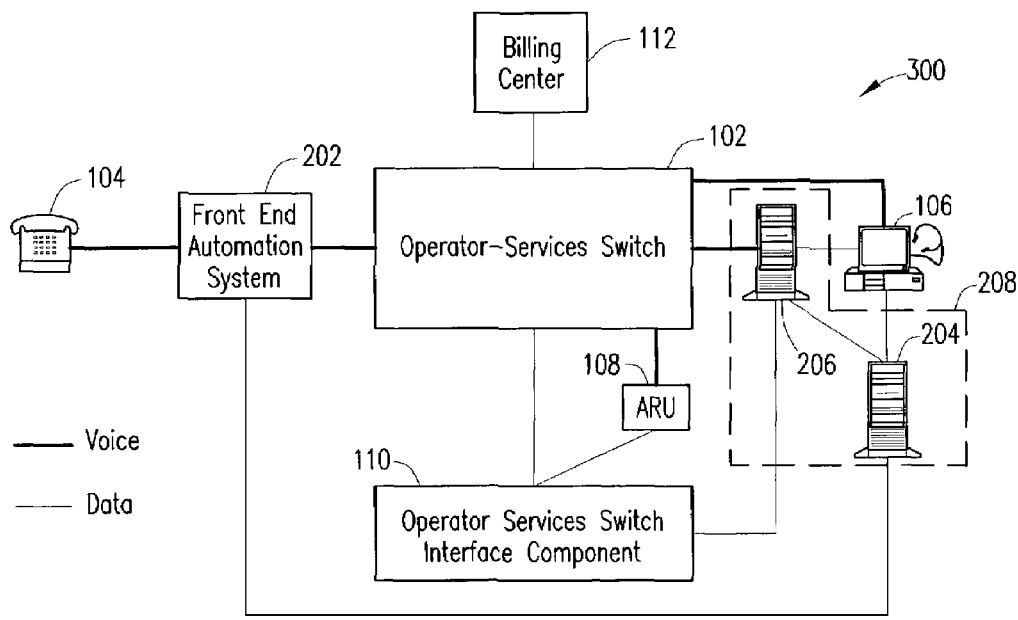
FIG. 3 is a block diagram of an operator services system in accordance with principles of the present invention that is adopted to permit partially-recognized directory-assistance request information to be utilized.

FIG. 3 is a block diagram of an operator services system 300 in accordance with principles of the present invention that is adapted to permit partially-recognized directory-assistance request information to be utilized. The system 300 includes the subscriber set 104, which is connected to the front end automation system 202 via a voice connection. The front end automation system 202 is connected via a voice connection to the operator services switch 102 and via a data connection to the automation data server 204.

The automation data server 204 is connected via respective data connections to the automated operator 206 and the operator work station 106. The automated operator 206 is connected via a voice connection to the operator services switch 102, via a data connection to the operator services switch interface component 110, and via a data connection to the operator work station 106. The back end automation system 208 is indicated by dashed lines.

Although the back end automation system 208 is shown in FIG. 3 as including two discrete entities, this need not be the case. The back end automation system 208 of a preferred embodiment of the present invention includes the automation data server 204. However, other embodiments (not shown) of the present invention do not utilize an automation data server as part of a back end automation system. For example, when a back end automation system that does not include an automation data server (not shown) is used, an automated operator can signal the front end automation system 202 via a data message on in-band dual tone multi frequency (DTMF) signaling.

The operator work station is also connected to the operator services switch 102 via a voice connection. The operator services switch 102 is connected via a data connection to the billing center 112. The operator services switch interface component 110 is also connected via respective data connections to the automated response unit 108 and to the operator services switch 102. The automated response unit 108 is also connected via a voice connection to the operator services switch 102. Data connections are indicated in FIG. 3 by fine lines and voice connections are indicated in FIG. 3 by bold lines.

When a request of the caller has not been completely recognized by the front end automation system 202, the call needs to be passed to a human operator using, for example, the operator work station 106. The automated operator 206 can play a vital role when the front end automation system 202 recognizes only a part of the request of the caller placed via the subscriber set 104 (e.g., the city and state) but does not recognize another part of the request of the caller (e.g., the listing name). In a preferred embodiment, a recognized portion of the request of the caller is displayed to the human operator in a query line of the operator work station 106. Automatic display of the information recognized saves time by eliminating a need for the human operator to manually key the information recognized into the operator work station 106.

It is necessary to send the call through the operator services switch 102 to the automated operator 206 in order to facilitate association of the information recognized from the caller collected by the front end automation system 202 with information regarding the call assigned by the operator services switch 102. Once the automated operator 206 has associated the information recognized from the caller collected by the front end automation system 202 with the call information assigned by the operator services switch 102, the information recognized from the caller can be sent to the operator work station 106, where the information recognized from the caller can be displayed to the human operator and used for, for example, database searching purposes.

Thus, when only part of the information from the caller 104 has been recognized, the automated operator 206 can serve as an intermediate component that facilitates association of the call with the operator work station 106 so that the information recognized from the caller can be directed to the proper destination (i.e., the operator work station 106). To achieve passage of the information recognized from the caller to the operator work station 106, the front end automation system 202 forwards the call to the operator services switch 102 so that the call is assigned to an automated operator such as, for example, the automated operator 206. The automated operator 206 identifies a call identifier assigned by the operator services switch 102 and signals the call identifier to the front end automation system 202. The automated operator 206 then communicates with the operator services switch 102 to transfer the call from the automated operator 206 to an operator work station selected from an operator queue in the operator services switch 102. It is assumed for purposes of illustration that the operator work station 106 has been selected.

When the front end automation system 202 receives the call identifier assigned by the operator services switch 102, the front end automation system 202 sends information including the information recognized from the caller, the call identifier, and the time and date of the call to the automation data server 204. When the operator workstation 106 receives a call begin message from the operator services switch 102, software of the operator work station 106 sends a request message to the automation data server 204 that specifies the call identifier sent to the operator work station 106 in the call begin message.

The automation data server 204 responds to the operator work station 106 with the call information previously received by the automation data server 204 from the front end automation system 202 that matches the call identifier. When the software of the operator work station 106 receives the call information associated with the call identifier from the automation data server 204, the information recognized from the caller is automatically displayed in the query line of the display of the operator work station 106, which allows the human operator to avoid manually keying in the information recognized.

Figure 4:
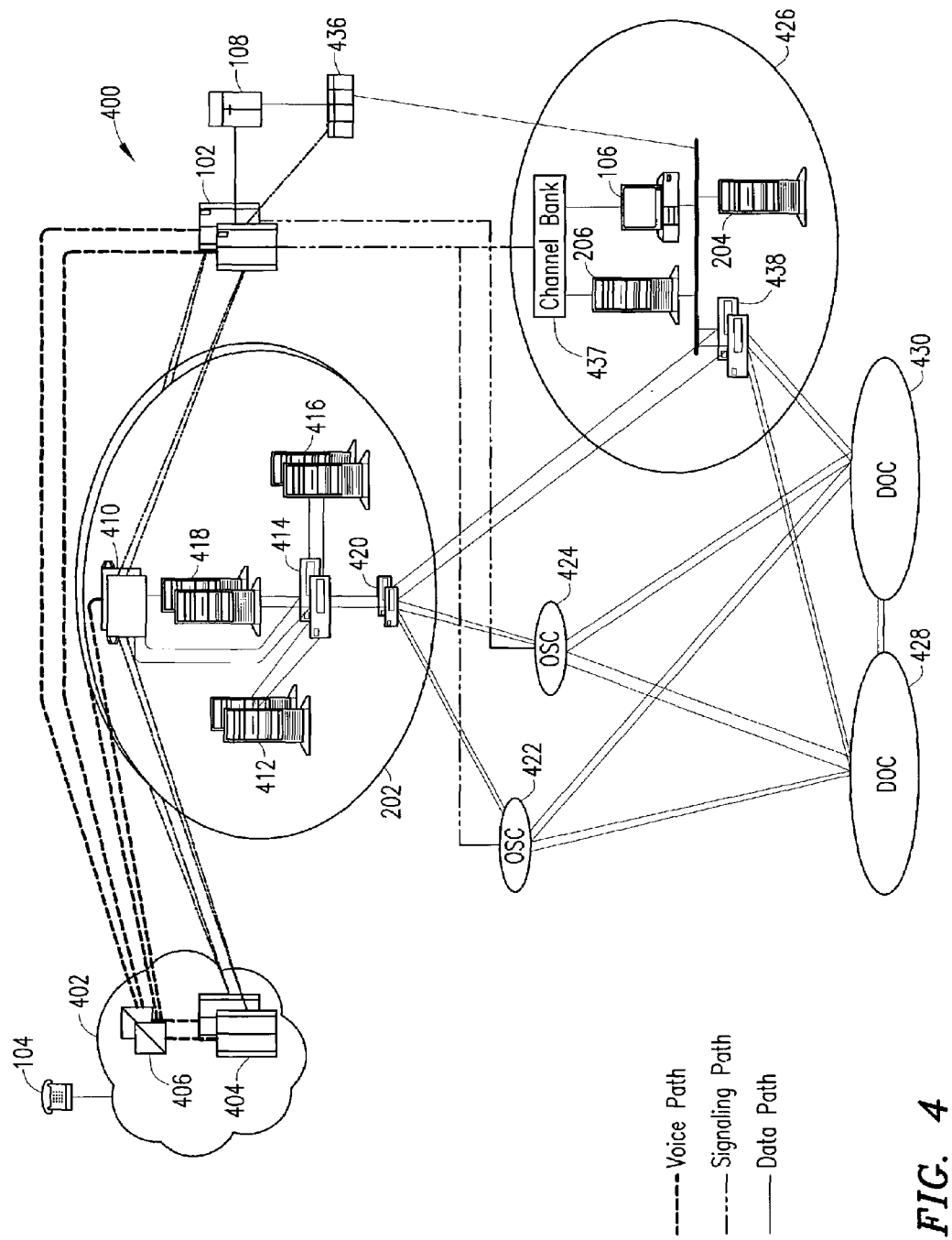
FIG. 4 is a detailed block diagram of an operator services system in accordance with principles of the present invention.

FIG. 4 is a detailed block diagram of an operator services system 400 in accordance with principles of the present invention. FIG. 4 shows entities illustrated in FIGS. 2–3 in greater detail. In FIG. 4, signaling paths are designated by uniform dashed lines, voice paths are designated by non-uniform dashed lines, and data paths are designated by solid lines. The system 400 includes a network 402 that includes a tandem switch 404 to which the subscriber set 104 can connect. The tandem switch 404 is typically a concentrator switch that takes calls from multiple end offices and routes the calls on to an operator services system. The network 402 also includes a signaling transfer point (STP) 406, which is connected to the tandem switch 404 and also to the operator services switch 102. The signaling transfer point 406 is part of a Signaling System 7 (SS7) network within which switch-to-switch signaling information takes place.

Voice path T1/T3 connects the tandem switch 404 to a programmable switch (PS) 410, which is part of the front end automation system 202, the front end automation system 202 being shown in more detail in FIG. 4 than in FIG. 2 or FIG. 3. The T1/T3 path also connects the tandem switch 404 to the operator services switch 102. The programmable switch 410 is typically a dumb entity that includes a switching fabric and requires an external host to direct the programmable switch 410. A call distribution system (CDS) 412 of the front end automation system 202 typically includes a plurality of servers that have software that provides operating intelligence for the programmable switch 410.

The front end automation system 202 also includes a plurality of ethernet switches 414, a recognition server (Reco server) 416, an interactive voice response unit (IVR) 418, and a plurality of routers 420. The interactive voice response unit 418, which is connected to the programmable switch 410, is responsible for playing a greeting, prompting the caller for a request, invoking the recognition server 416, and then either quoting a telephone number (or other information) or passing the call to a human operator. The recognition server 416 includes speech-recognition technology used by the system 400 to listen to a request of the caller, try to match the request via recognition grammar, and then respond to the interactive voice response unit 418 with what the recognition server 416 determines is the best match for the request of the caller.

When a voice connection is made between the tandem switch 404 and the programmable switch 410, a message is sent over an SS7 path between the signaling transfer point 406 and the programmable switch 410. The message over the SS7 path notifies the programmable switch 410 of details of the voice connection between the programmable switch 410 and the tandem switch 404, such as, for example, which trunk the voice connection is on and other call information.

The interactive voice response unit 418, the recognition server 416, and the call distribution system 412 are connected to one another and to the routers 420 via the ethernet switches 414. The routers 420 provide a data path to remote sites such as, for example, operator service centers 422, 424, and 426. The operator service centers 422, 424, and 426 are connected by data paths to data operations centers 428 and 430. The data operations centers 428 and 430 include databases for access by operators to listing information including telephone numbers. The data operations centers 428 and 430 may contain other information to be provided to callers at the callers' request. A telephone company may also access the data operations centers 428 and 430 for access to listings outside own its subscriber territory. When the caller makes a request, the human operator at the operator work station 106 can key in the request and initiate a search that results in appropriate listings.

At least one operator is included in each of the operator service centers 422, 424, and 426. The operator service centers 422, 424, and 426 each provide a connection to operators for automatic call distribution. The operators can be either human or automated operators, the automated operator 206 and the operator work station 106 used by a human operator being shown relative to the operator service center 426.

When a call needs to be passed on to an operator, the call goes to the operator services switch 102. Signaling provided from the programmable switch 410 to the operator services switch 102 can be different when the call is to go to an automated operator than when the call is to go to a human operator at an operator work station. The operator services switch 102 can also evaluate signaling information and determine, for example, that the call is a Spanish-speaking call and route the call to a Spanish-speaking operator. The operator services switch 102 interfaces with the automated operator 206 and the operator work station 106 via a channel bank 437 in the operator service center 426. The channel bank 437 takes T1 multiplexed voice signals and breaks the multiplexed signals up into individual voice channels that go to the operator work station 106 and the automated operator 206.

The operator work station 106 and the automated operator 206 are linked via a data path to a gateway server (GS) 436. The gateway server 436 can perform the functions of the operator services switch interface component 110. The automation data server 204 serves as the link between the front end automation system 202 and the automated operator 206. The gateway server 436 may include a database server that a human operator at an operator work station such as the operator work station 106 accesses to get database listings.

The operator service center 426 includes a plurality of routers 438 that provide a data path to remote sites, such as, for example, the routers 420 and the data operations centers 428 and 430. The routers 438 allow the automation data server 204, the operator work station 106, and the automated operator 206 to communicate with the remote sites.

The automated response unit 108 is used on a call in which a human operator using, for example, the operator work station 106, does not quote the telephone number to the caller. The human operator at the operator work station 106 instead makes an announcement request that is sent to the automated response unit 108 via the gateway server 436. In response to the announcement request, the automated response unit 108 plays a telephone number (or other information) announcement. The automated response unit 108 is connected to the operator services switch 102 via a voice path and to the gateway server 436 via a data path.

Figure 5:
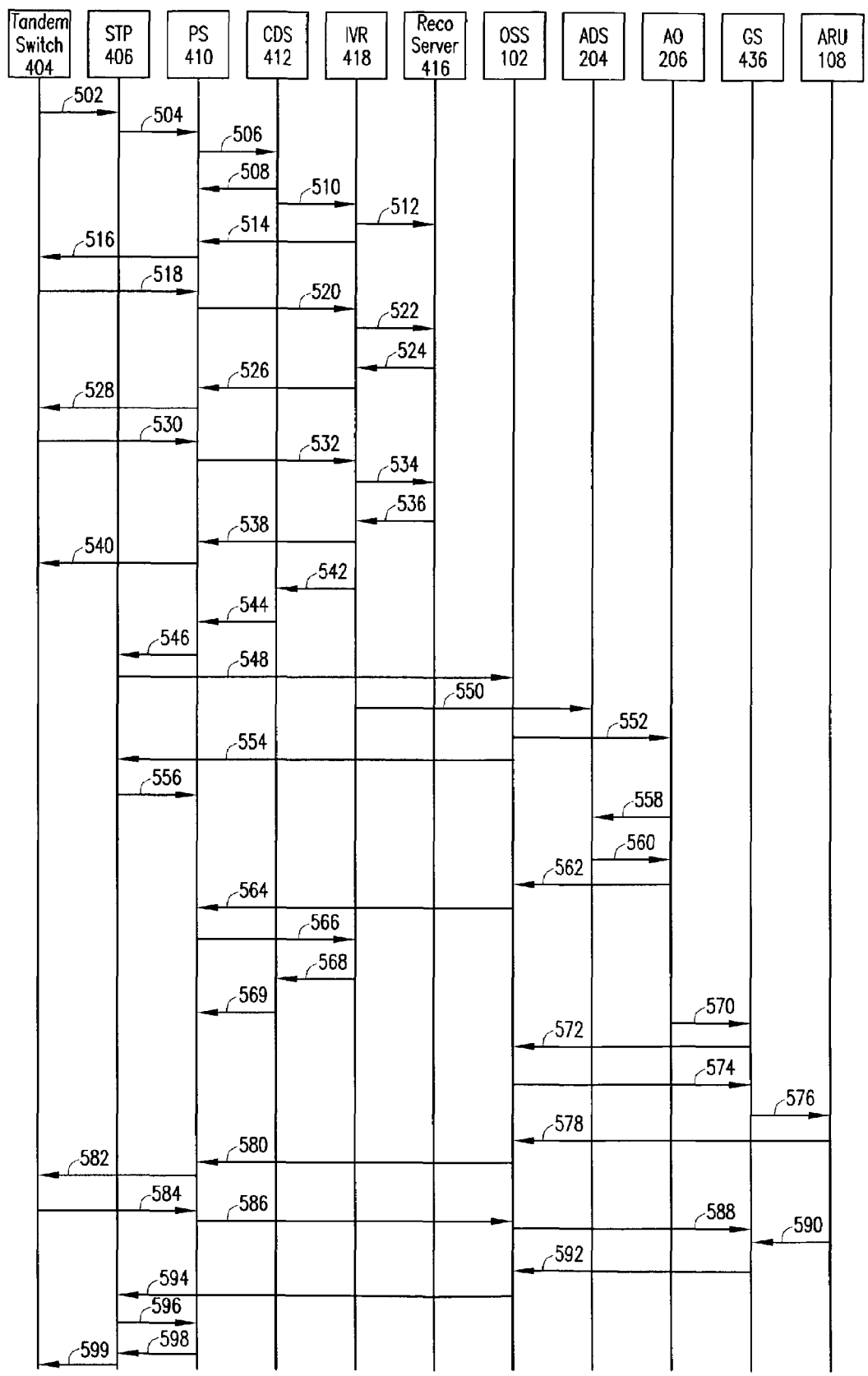
FIG. 5 is a message-and-voice-communication flow diagram that illustrates messages and voice communications during operation of the system 400 when a request of a caller has been completely recognized.

Exemplary operation of the system 400 will now be described with reference to FIG. 4 and FIG. 5. FIG. 5 is a message-and-voice-communication flow diagram that illustrates messages and voice communications during operation of the system 400 when a request of a caller has been completely recognized. The term message designates signaling or data communications between entities of the system 400. The term voice communication designates a voice communication between entities of the system 400. Messages and voice communications shown between two given entities illustrated in FIG. 5 can traverse entities located between the two given entities other than those shown in FIG. 5.

When the caller places a directory-assistance call (e.g., dials 411 or 555-1212), the call arrives at the programmable switch 410, as indicated by a signaling message 502 from the tandem switch 404 to the signaling transfer point 406 and a message 504 from the signaling transfer point 406 to the programable switch 410. Upon receipt of the message 504, the programable switch 410 knows that the call has arrived. In response to the message 504, the programable switch 410 notifies the call distribution system 412 that the call has arrived and provides call information to the call distribution system 412 via a message 506.

In response to the message 506, the call distribution system 412 notifies the programable switch 410, via a message 508, to connect the call from the subscriber set 104 to an available port of the interactive voice response unit 418. In a message 510, the call distribution system 412 notifies the interactive voice response unit 418 that the call has arrived so that software of the interactive voice response unit 418 is informed of what to do with the call. In response to the message 510, the interactive voice response unit 418 answers the call from the subscriber set 104 and connects to a recognition resource on the recognition server 416 via a message 512.

Next, the interactive voice response unit 418 establishes a voice connection to the subscriber set 104 via the programable switch 410 and the tandem switch 404 using voice communications 514 and 516. Upon establishment of the voice connection between the interactive voice response unit 418 and the subscriber set 104, a greeting, such as, for example, "Welcome to xyz directory assistance. What city, please?" is played to the caller.

In response to the greeting, the caller can respond, for example, with a city name (e.g. "Houston, Tex."). The response of the caller to the greeting is conveyed to the recognition server 416 via a voice communication 518 from the tandem switch 404 to the programmable switch 410, a voice communication 520 from the programmable switch 410 to the interactive voice response unit 418, and a voice communication 522 from the interactive voice response unit 418 to the recognition server 416. Upon recognition of the city, the recognition server 416 responds to the interactive voice response unit 418 with a message 524, the message 524 including a city identifier (e.g., a code identifying Houston, Tex.). In response to the message 524, the interactive voice response unit 418 prompts the caller for the name of the listing requested by the caller via a voice communication 526 to the programmable switch 410, which forwards the prompt by the interactive voice response unit 418 to the tandem switch 404 via a voice communication 528.

The caller responds to the recognition server 416 via a voice communication 530 from the tandem switch 404 to the programmable switch 410, a voice communication 532 from the programmable switch 410 to the interactive voice response unit 418, and a voice communication 534 from the interactive voice response unit to the recognition server 416. In response to the caller, the recognition resource of the recognition server 416 attempts to match the listing name from the caller against a recognition vocabulary. If a listing name requested by the caller (e.g., "Hyatt Hotel") is recognized by the recognition resource, the recognition server 416 returns a recognized result to the interactive voice response unit 418 via a message 536. In response to the message 536, the interactive voice response unit 418 releases the recognition resource of the recognition server 416 and responds to the caller with a "please-wait" message, the "please-wait" message being sent from the interactive voice response unit 418 to the caller via a voice communication 538 from the interactive voice response unit 418 to the programmable switch 410 and a voice communication 540 from the programmable switch 410 to the tandem switch 404.

Next, the interactive voice response unit 418 sends a message 542 to the call distribution system 412 that directs the call distribution system 412 to mute the voice connection to the subscriber set 104 and to initiate a call to the operator services switch 102. In response to the message 542, the call distribution system 412 commands the programmable switch 410, via a message 544, to call the operator services switch 102. At message 544, the city and the listing have been recognized and the interactive voice response unit 418 has asked the caller to wait.

In response to the message 544, the programmable switch 410 signals the operator services switch 102 via a message 546 to the signaling transfer point 406 and a message 548 from the signaling transfer point 406 to the operator services switch 102. The messages 546 and 548 are used to indicate to the operator services switch 102 that a call is being placed from the programmable switch 410 to the operator services switch 102. Call information included in the message 544 received by the programmable switch 410 is included in the messages 546 and 548, so that the operator services switch 102 can properly bill the call made by the caller.

Next, the interactive voice response unit 418 sends a message 550 to the automation data server 204. The message 550 includes information recognized about the request of the caller (e.g., Houston, Tex., and Hyatt Hotel) and a trunk identifier for a trunk selected to forward the call to the operator services switch 102.

In response to the message 548, the operator services switch 102 performs initial call screening, billing restriction checks, and generates a call detail record for the call by the caller. The operator services switch 102 searches for an available automated operator to handle the call in response to signaling included in the message 548. When a channel of an automated operator (e.g., the automated operator 206) becomes available, the operator services switch 102 connects to the automated operator, as indicated by a message 552 to the automated operator 206. After the operator services switch 102 has assigned the call to, for example, the automated operator 206, the operator services switch 102 sends an SS7 answer message to the programmable switch 410 via the signaling transfer point 406, as indicated by messages 554 and 556. The messages 554 and 556 are used to signal the programmable switch 410 that the operator services switch 102 has achieved a connection to an automated operator (e.g., the automated operator 206).

In response to the message 552, the automated operator 206 queries the automation data server 204 via a message 558. The message 558 is used to provide call information provided to the automated operator 206 by the operator services switch 102 and to fetch information from the automation data server 204 that was passed from the interactive voice response unit 418 to the automation data server 204 in the message 550. In response to the message 558, the automation data server 204 sends a message 560 to the automated operator 206 that contains the information requested by the automated operator 206 in the message 558. Upon receipt of the message 560, the automated operator 206 now has the information necessary to continue directory-assistance service to the caller.

The operator services switch 102 has established a voice connection between the interactive voice response unit 418 and the automated operator 206 via a voice communication 562 between the automated operator 206 and the operator services switch 102, a voice communication 564 between the operator services switch 102 and the programmable switch 410, and a voice communication 566 between the programmable switch 410 and the interactive voice response unit 418. The interactive voice response unit 418 instructs the call distribution system 412 to disconnect the voice connection for the call from the interactive voice response unit 418 and instructs the call distribution system 412 via a message 568 to connect the voice connection for the call directly to the automated operator 206. The call distribution system 412 sends message 569 to the programmable switch 410 instructing the programmable switch 410 to implement instructions in the message 568. At the message 569, a voice connection has been established between the subscriber set 104 and the automated operator 206 through the programmable switch 410. The automated operator 206 is in control of the call at this point.

Next, the automated operator 206 performs call screening logic to determine proper handling of the call and then sends an announcement request via a message 570 to the gateway server 436 and provides the telephone number to be announced in response to the request of the caller, any special announcement conditions, and eligibility for call completion. The gateway server 436 communicates with the operator services switch 102 in order to instruct the operator services switch 102 to transfer the call to a voice response system (i.e., the automated response unit 108). The gateway server 436 requests that the operator services switch 102 transfer the call of the caller from the automated operator 206 to an available port of the automated response unit 108 via a message 572. In response to the message 572, the operator services switch 102 informs the gateway server 436 via a message 574 of the port of the automated response unit 108 to which the call of the caller has been connected and then disconnects the automated operator 206 from the call of the caller and connects the automated response unit 108 to the subscriber set 104 via the programmable switch 410 and the tandem switch 404.

An announcement request message 576 is sent to the automated response unit 108 by the gateway server 436. The announcement request message 576 specifies announcement information provided by the automated operator 206 to the gateway server 436 in the message 570. Next, the automated response unit 108 announces the telephone number to the caller via a voice communication 578 between the automated response unit 108 and the operator services switch 102, a voice communication 580 between the operator services switch 102 and the programmable switch 410, and a voice communication 582 between the programmable switch 410 to the tandem switch 404. In addition, the automated response unit 108 can optionally offer call completion to the caller. If the caller is eligible for call completion, the automated response unit 108 will prompt the caller to indicate whether the caller wants to have the call automatically completed. In some cases, the call can be automatically connected without asking for a preference of the caller regarding automatic call completion. If the caller is eligible for call completion and wants the call to be completed, the caller can, for example, select a number on a dial pad, which selection is forwarded to the automated response unit 108 via a voice communication 584 from the tandem switch 404 to the programmable switch 410, a voice communication 586 from the programmable switch 410 to the operator services switch 102, and a voice communication 588 from the operator services switch 102 to the automated response unit 108. In response to the selection of the caller, the automated response unit 108 sends a call-completion message 590 to the gateway server 436, which message instructs the gateway server 436 to complete the call.

In response to the message 590, the gateway server 436 sends a message 592 to the operator services switch 102 instructing the operator services switch 102 to complete the call. In response to the message 592, the operator services switch 102 sends a message 594 to the signaling transfer point 406, the signaling transfer point 406 sends a message 596 to the programmable switch 410, and the programmable switch 410 sends a message 598 to the signaling transfer point 406. The signaling transfer point 406 sends a message 599 to the tandem switch 404. The message 599 instructs the tandem switch 404 to transfer the call to the destination number. In response to the message 599, the tandem switch 404 drops the voice connection to the operator services switch 102 through the programmable switch 410 and the tandem switch 404 takes control of the call and dials a voice connection for the subscriber set 104 to the destination number.

Figure 6:
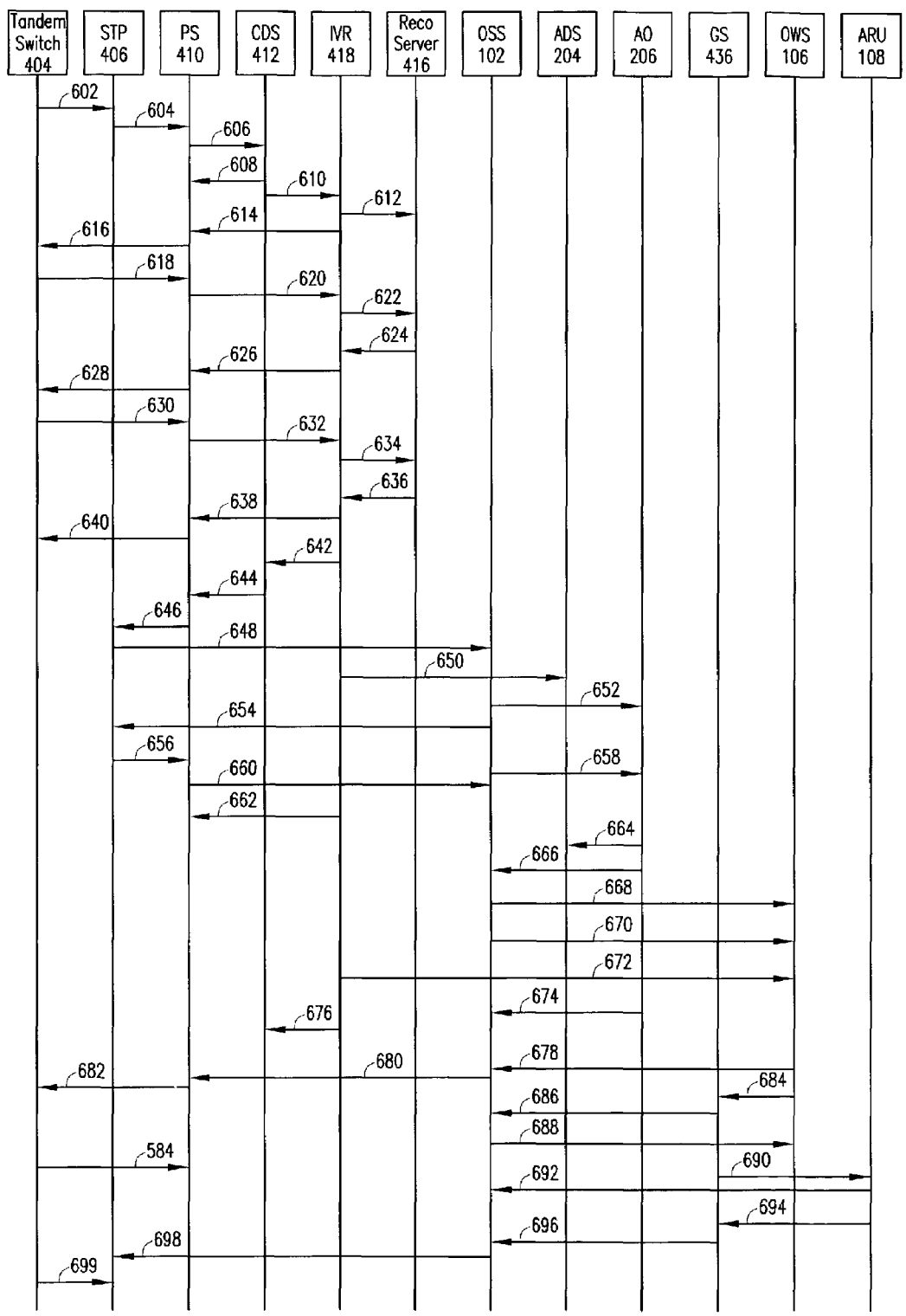
FIG. 6 is a message-and-voice-communication flow diagram that illustrates messages and voice communications during operation of the system 400 when not all of a caller's request has been recognized.

Exemplary operation of the system 400 will now be described with reference to FIG. 4 and to FIG. 6. FIG. 6 is a message-and-voice-communication flow diagram that illustrates messages and voice communications during operation of the system 400 when not all of a caller's request has been recognized. Messages designate signaling or data communications, as opposed to voice communications, between entities of the system 400. Messages and voice communications shown between two given entities illustrated in FIG. 6 can traverse entities located between the two given entities other than those shown in FIG. 6.

When the caller places a directory-assistance call (e.g., dials 411 or 555-1212), the call arrives at the programmable switch 410, as indicated by a signaling message 602 from the tandem switch 404 to the signaling transfer point 406 and a message 604 from the signaling transfer point 406 to the programable switch 410. Upon receipt of the message 604, the programable switch 410 knows that the call has arrived. In response to the message 604, the programable switch 410 notifies the call distribution system 412 that the call has arrived and provides call information to the call distribution system 412 via a message 606.

In response to the message 606, the call distribution system 412 notifies the programable switch 410, via a message 608, to connect the subscriber set 104 to an available port of the interactive voice response unit 418. In a message 610, the call distribution system 412 notifies the interactive voice response unit 418 that the call has arrived so that software of the interactive voice response unit 418 is informed of what to do with the call. In response to the message 610, the interactive voice response unit 418 answers the call from the caller and connects to a recognition resource on the recognition server 416 via a message 612.

Next, the programmable switch 410 establishes a voice connection between the interactive voice response unit 418 and the subscriber set 104 via the programable switch 410 and the tandem switch 404 using voice communications 614 and 616. Upon establishment of the voice connection between the interactive voice response unit 418 and the subscriber set 104, a greeting, such as, for example, "Welcome to xyz directory assistance. What city, please?" is played to the caller.

In response to the greeting, the caller can respond, for example, with a city name (e.g. "Houston, Tex."). The response of the caller to the greeting is conveyed to the recognition server 416 via a voice communication 618 from the tandem switch 404 to the programmable switch 410, a voice communication 620 from the programmable switch 410 to the interactive voice response unit 418, and a voice communication 622 from the interactive voice response unit 418 to the recognition server 416. If the city is recognized, the recognition server 416 responds to the interactive voice response unit 418 with a message 624, the message 624 including a city identifier (e.g., a code identifying Houston, Tex.). In response to the message 624, the interactive voice response unit 418 prompts the caller for the name of the listing requested by the caller via a voice communication 626 to the programmable switch 410, which forwards the prompt by the interactive voice response unit 418 to the tandem switch 404 via a voice communication 628.

The caller responds to the recognition server 416 via a voice communication 630 from the tandem switch 404 to the programmable switch 410, a voice communication 632 from the programmable switch 410 to the interactive voice response unit 418, and a voice communication 634 from the interactive voice response unit to the recognition server 416. In response to the caller, the recognition resource of the recognition server 416 attempts to match the listing name from the caller against a recognition vocabulary. If a listing name requested by the caller (e.g., "Hyatt Hotel") is not recognized by the recognition resource, the recognition server 416 returns a "not recognized" result to the interactive voice response unit 418 via a message 636. In response to the message 636, the interactive voice response unit 418 releases the recognition resource and responds to the caller with a "please-wait" message, the "please-wait" message being sent from the interactive voice response unit 418 to the caller via a voice communication 638 from the interactive voice response unit 418 to the programmable switch 410 and a voice communication 640 from the programmable switch 410 to the tandem switch 404.

Next, the interactive voice response unit 418 sends a message 642 to the call distribution system 412 that directs the call distribution system 412 to mute the voice connection to the subscriber set 104 and to initiate a call to the operator services switch 102. In response to the message 642, the call distribution system 412 commands the programmable switch 410, via a message 644, to call the operator services switch 102. At message 644, the city has been recognized, the listing name has not been recognized, and the interactive voice response unit 418 has asked the caller to wait.

In response to the message 644, the programmable switch 410 signals the operator services switch 102 via a message 646 to the signaling transfer point 406 and a message 648 from the signaling transfer point 406 to the operator services switch 102. The messages 646 and 648 are used to indicate to the operator services switch 102 that a call is being placed from the programmable switch 410 to the operator services switch 102. Call information included in the message 644 received by the programmable switch 410 is included in the messages 646 and 648, so that the operator services switch 102 can properly bill the call made by the caller.

Next, the interactive voice response unit 418 sends a message 650 to the automation data server 204. The message 650 includes information recognized about the request of the caller (e.g., Houston, Tex.) and a trunk identifier for a trunk selected to forward the call to the operator services switch 102.

In response to the message 648, the operator services switch 102 performs initial call screening, billing restriction checks, and generates a call detail record for the call by the caller. The operator services switch 102 searches for an available automated operator to handle the call in response to signaling included in the message 648. When a channel of an automated operator (e.g., the automated operator 206) becomes available, the operator services switch 102 connects to the automated operator, as indicated by a message 652 to the automated operator 206. After the operator services switch 102 has assigned the call to, for example, the automated operator 206, the operator services switch 102 sends an SS7 answer message to the programmable switch 410 via the signaling transfer point 406, as indicated by messages 654 and 656. The messages 654 and 656 are used to signal the programmable switch 410 that the operator services switch 102 has achieved a connection to an automated operator (e.g., the automated operator 206).

Next, a voice connection is established between the interactive voice response unit 418 and the automated operator 206 via a voice connection 658 between the automated operator 206 and the operator services switch 102, a voice connection 660 between the operator services switch 102 and the programmable switch 410, and a voice connection 662 between the programmable switch 410 and the interactive response unit 418. After the voice connection has been established between the interactive voice response unit 418 and the automated operator 206, the automated operator 206 listens for the trunk identifier assigned by the call distribution system 412 to be communicated using DTMF signaling by the interactive voice response unit 418. Next, the automated operator 206 queries the automation data server 204 via a message 664 and uses the trunk identifier to identify information for the call, which information is returned to the automated operator 206.

The automated operator 206 requests, via a message 666 to the operator services switch 102, that the call be transferred to a human operator queue in a conference mode. The conference mode requires that the automated operator 206 and the operator work station 106 be simultaneously connected to the call for a period of time. The automated operator 206 may also pass, via the message 666, details of the information recognized by the front end automation system 202 and retrieved from the automation data server 204. The information recognized is provided by the operator services switch 102 to the operator work station 106 in a data message 668 that is sent when the operator services switch 102 establishes a voice connection to the operator work station 106. In response to the message 668, a voice connection 670 is established between the operator work station 106 and the operator services switch 102.

The automated operator 206 signals the interactive voice response unit 418 via DTMF signaling over the voice connections 658, 660, and 662 to play to the operator a recording of the portion of the caller's request that was not recognized and then to drop off the call. If the information recognized was not passed through the operator services switch 102 in conjunction with establishment of the voice connection 670, the information recognized is sent, via a message 672, to the operator work station 106 by the interactive voice response unit 418. Although the message 672 traverses the routers 420 and 438, these entities are not explicitly shown in FIG. 6.

After the operator work station 106 receives the information recognized, the information recognized is automatically provided (e.g., via display on a video screen) to a human operator for use in handling the call. Automatic provision of the information recognized to the human operator allows the human operator to avoid requesting the information recognized from the caller and inputting the information recognized into the operator work station 106.

Next, the automated operator 206 sends a message 674 to the operator services switch 102 and requests that the automated operator 206 be disconnected from the call. The interactive voice response unit 418 instructs the call distribution system 412, via a message 676, to disconnect the voice connection from the interactive voice response unit 418 for this call and to establish a voice connection between the subscriber set 104 and the operator work station 106. In response to the message 676, a voice connection between the subscriber set 104 and the operator work station 106 is established via voice connections 678, 680, and 682. After the voice connection between the subscriber set 104 and the operator work station 106 has been established, the human operator at the operator work station 106 uses the information recognized, information played by the interactive voice response unit 418, and information obtained by talking with the caller to locate the information requested by the caller. On any individual call, either or both of the information recognized and the information played by the interactive voice response unit 418 might not be present. If either or both is not present or is not sufficient for the human operator to determine what is being requested, the human operator might be required to engage in an additional discussion with the caller.

After the information requested by the caller is located, an announcement request is sent, via message 684, by the operator work station 106, as directed by the human operator, to the gateway server 436. The announcement request of the message 684 provides the telephone number to be announced, any special announcement conditions, and potential eligibility for call completion. The gateway server 436 requests, via message 686, that the operator services switch 102 transfer the call from the operator work station 106 to an available port on the automated response unit (ARU) 108, which is used for end-of-call announcement. The operator services switch 102 then informs the gateway server 436 of the port to which the subscriber set 104 has been connected. In a message 688, the operator services switch 102 disconnects the operator work station 106 from the call.

Next, an announcement request is sent, via a message 690, to the automated response unit 108, which has already been connected to the subscriber set 104. The announcement request of the message 690 specifies announcement information sent from the human operator at the operator work station 106. The back end interactive voice response unit announces the telephone number to the caller via a voice connection 692 and the voice connections 680 and 682.

If the caller is eligible for a call completion, the automated response unit 108 prompts the caller, via the voice connection 692, to inquire whether the caller wants the call to be automatically completed. In some cases, the call will be automatically completed without the caller being asked for a preference. If the caller wants the number to be automatically dialed, the caller will, in a preferred embodiment, press a predefined number on their telephone keypad or verbally respond. The automated response unit 108, upon hearing the response of the caller, sends a message 694 to the gateway server 436 to indicate call completion. In response to the message 694, the gateway server 436 sends a call completion request to the operator services switch 102 via a message 696.

In response to the message 696, the operator services switch 102 disconnects the automated response unit 108 from the call and sends an SS7 signaling message 698 to the signaling transfer point 406, which sends an SS7 signaling message 699 to the programmable switch 410. The messages 698 and 699 request that the call be transferred to a destination telephone number matching the request of the caller. The programmable switch 410 forwards the SS7 call-completion request message 696 via the signaling transfer point 406 to the tandem switch 404, which is the switch from which the programmable switch 410 received the call. In some cases, the switch from which the programmable switch 410 received the call does not support call-completion signaling, in which case it may be necessary to dial the destination number directly from the programmable switch 410 and connect the subscriber set 104 to the newly-dialed out going trunk. In the meantime, the operator services switch 102 completes and records its call detail record for use in subsequent billing.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without department from the invention defined by the following claims.

What is claimed is:

1. An operator service system comprising:
a front end automation system adapted to recognize a request for information from a caller and initiate a call to an operator services switch;
an operator services switch inter-operably coupled to the front end automation system and adapted to receive the call after the front end automation system has received the call and create billing information relative to the call;
a back end automation system inter-operably coupled to the operator services switch and to the front end automation system, the back end automation system being adapted to respond to the request via the operator services switch; and
wherein the front end automation system is adapted to send information relative to the request to the back end automation system in response to the request, the information relative to the request being sent via a path independent of the operator services switch.

2. The operator services system of claim 1, wherein the information relative to the request comprises information regarding a response to be given to the caller.

3. The operator services system of claim 1, wherein the back end automation system comprises an automation data server and an automated operator.

4. The operator services system of claim 3, wherein the automated operator is adapted to announce information responsive to the request to the caller via the operator services switch.

5. The operator services system of claim 3, wherein the automated operator is adapted to notify the front end automation system, via the operator services switch, to disconnect the call from the operator services switch and announce information responsive to the request to the caller.

6. The operator services system of claim 3, wherein the automated operator is adapted to send an announcement request to an operator services switch interface component inter-operably coupled to the operator services switch, the announcement request comprising information regarding a response to the request.

7. The operator services system of claim 3, wherein the operator services switch is adapted to assign the call to the automated operator in response to receipt of the call from the front end automation system.

8. The operator services system of claim 1, wherein the back end automation system comprises an automation data server and an automated operator, the automation data server being adapted to receive the information relative to the request from the front end automation system, and the automated operator being adapted to query the automation data server to obtain information regarding a response to the request to be given to the caller.

9. The operator services system of claim 1, wherein the operator services switch is adapted to transfer the call from the back end automation system to an operator work station.

10. The operator services system of claim 1, wherein the front end automation system is adapted to send to the back end automation system information recognized from the request for information, the information recognized representing less than all of the request for information.

11. The operator services system of claim 10, wherein the operator work station is adapted to send information received from the operator services switch and identifying the call to the back end automation system in response to receipt of a message from the operator services switch, the message specifying the information identifying the call.

12. The operator services system of claim 11, wherein the back end automation system is adapted to respond to the information identifying the call received from the operator work station by sending the information recognized to the operator work station.

13. The operator services system of claim 12, wherein the operator work station is adapted to display the information recognized in response to receipt of the information recognized from the back end automation system.

14. The operator services system of claim 9, wherein the back end automation system comprises an automation data server and an automated operator.

15. The operator services system of claim 10, wherein the back end automation system comprises an automation data server and an automated operator.

16. The operator services system of claim 15, wherein the automation data server is adapted to receive from the front end automation system the information recognized from the request for information.

17. A method of responding to a request for information of a caller, the method comprising:
receiving the request from the caller at an operator services system;
recognizing the request in an automated fashion by a front end automation system of the operator services system;
initiating a call relative to the request to an operator services switch of the operator services system, the operator services switch receiving the call after the front end automation system has received the call;
generating, by the operator services switch, of billing information regarding the call; and
sending information relative to the request from the front end automation system to a back end automation system of the operator services system on a path independent of the operator services switch the back end automation system being adapted to respond to the request via the operator services switch.

18. The method of claim 17, further comprising:
generating, by the operator services switch, of information identifying the initiated call;
receiving the information relative to the request and the information identifying the call;
associating the information relative to the request with the information identifying the call; and
using the received information relative to the request and the information identifying the call to respond to the request.

19. The method of claim 18, wherein the information relative to the request comprises information regarding a response to be given to the caller.

20. The method of claim 17, wherein the back end automation system comprises an automation data server and an automated operator.

21. The method of claim 20, wherein the step of using comprises announcing, by the automated operator, of information responsive to the request to the caller via the operator services switch.

22. The method of claim 20, wherein the step of using comprises notifying the front end automation system, via the operator services switch, to disconnect the call from the operator services switch and announce information responsive to the request to the caller.

23. The method of claim 20, wherein the step of using comprises sending, by the automated operator, of an announcement request to an operator services switch interface component inter-operably coupled to the operator services switch, the announcement request comprising a response to the request.

24. The method of claim 20, further comprising assigning, by the operator services switch, of the call to the automated operator in response to receipt of the call from the front end automation system.

25. The method of claim 17, wherein the back end automation system comprises an automation data server and an automated operator, the automation data server receiving the information relative to the request from the front end automation system, and the automated operator querying the automation data server to obtain information regarding a response to the request to be given to the caller.

26. A method of responding to a request for information of a caller the method comprising:
receiving the request from the caller at an operator services system;
recognizing, in an automated fashion, less than all of the request by a front end automation system of the operator services system;
initiating a call relative to the request to an operator services switch of the operator services system, the operator services switch receiving the call after the front end automation system has received the call;
generating, by the operator services switch, of billing information regarding the call; and
sending, by the front end automation system to a back end automation system of the operator services system via a path independent of the operator services switch, of information identifying information recognized from the request.

27. The method of claim 26, further comprising transferring, by the operator services switch, of the call from a back end automation system of the operator services system to an operator work station.

28. The method of claim 26, wherein none of the request is recognized in the step of recognizing.

29. The method of claim 26, wherein a portion of the request is recognized in the step of recognizing.

30. The method of claim 27, further comprising sending, by the operator work station, of call-identifying information received from the operator services switch to the back end automation system in response to receipt of a message from the operator services switch, the message specifying the call-identifying information.

31. The method of claim 30, further comprising responding, by the back end automation system, to the call-identifying information received from the operator work station by sending information identifying information recognized from the request to the operator work station.

32. The method of claim 31, further comprising displaying, by the operator work station, of the information identifying the information recognized in response to receipt of the information identifying the information recognized from the back end automation system.

33. The method of claim 32, wherein the information identifying the information recognized indicates that no information was recognized.

34. The method of claim 32, wherein the information identifying the information recognized identifies a portion of the request.

35. The method of claim 32, further comprising receiving, by the automation data server from the front end automation system, of the information identifying the information recognized from the request.

* * * * *